United States Patent Office 3,083,217
Patented Mar. 26, 1963

3,083,217
TETRASUBSTITUTED DIACYLOXYDITIN COMPOUNDS
Albert K. Sawyer and Henry G. Kuivila, Durham, N.H., assignors, by mesne assignments, to Metal & Thermit Corporation, Woodbridge, N.J., a corporation of New Jersey
No Drawing. Filed Oct. 4, 1960, Ser. No. 60,323
20 Claims. (Cl. 260—414)

This invention relates to novel organotin compounds and to processes for preparing them.

The organotin compounds of the present invention have the general formula

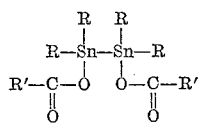

wherein R and R' are hydrocarbon groups and include such illustrative compounds as methyl, vinyl, butyl, octyl, lauryl, benzyl, cyclohexyl and phenyl groups. The R' group may also contain functional groups such as carboxy, hydroxy, etc. Preferred R groups are methyl, butyl, octyl, and phenyl groups. Preferred R'—COO— groups are benzoyloxy and those alkanoyloxy groups from the commonly available carboxylic acids having up to 18 carbon atoms in the chain including the equivalent substituted acids.

A disubstituted-tin dihydride and a carboxylic acid are reacted to form the 1,1,2,2-tetrasubstituted-1,2-diacyloxyditins in accordance with the reaction of Equation 1. Under specified conditions, the reaction of two moles of the carboxylic acid and one mole of the hydride yields the corresponding disubstituted-tin diacylate as illustrated in Equation 2.

(1) $2R_2SnH_2 + 2R'COOH$
$\rightarrow R_2Sn(OOCR')Sn(OOCR')R_2 + 3H_2$
(2) $R_2SnH_2 + 2R'COOH \rightarrow R_2Sn(OCOR')_2 + 2H_2$
(3) $R_2Sn(OCOR')_2 + R_2SnH_2$
$\rightarrow R_2Sn(OOCR')Sn(OOCR')R_2 + H_2$ The reaction product of the hydride and the carboxylic acid often contains the disubstituted-tin diacylate product of Reaction 2, as well as the product of Equation 1. The nature of the product will be determined by the nature and the concentrations of the reactants, and the reaction conditions. Diphenyltin dihydride is prone to give only the ditin regardless of the variation of acid concentration within the limits used. This relation holds over a change in acid strength over about five powers of ten. In the case of dibutyltin dihydride, it is possible to change the product composition from predominantly ditin (when using benzoic acid) to predominantly monotin, by merely doubling the acid concentration.

Another procedure for the preparation of the ditins is the reaction of a disubstituted-tin dihydride with a separately prepared disubstituted-tin diacylate as illustrated in Equation 3. Disubstituted-tin diacylate obtained from the reaction of the hydride and the carboxylic acid can be recycled in further reaction with disubstituted-tin dihydrides.

Where mixtures of disubstituted-tin dihydrides (e.g., $R_2{}^3SnH_2 + R_2{}^4SnH_2$ and/or $R^3R^4SnH_2$) are used with various carboxylic acids, mixed and/or unsymmetrical 1,1,2,2-tetrasubstituted diacyloxy compounds are prepared. It is also possible to react two or more carboxylic acids with the dihydride to obtain mixed and/or unsymmetrical 1,1,2,2-tetrasubstituted diacyloxy compounds.

The ditins of the present invention are prepared by reacting the disubstituted-tin dihydride and the carboxylic acid. Where one or both of the reactants are liquid, they are readily reacted without a solvent. Although solids may also be directly reacted in blending type operations, they are not readily worked and it is preferred to use a solvent. The choice of system and the particular solvent is dependent upon the particular reactants. Suitable solvents are inert to the reactants and the reaction products and include ethers such as diethyl ether, heptane, hexane, cyclohexane, toluene, benzene, chloroform, etc. For most of the commonly available reactants, the reaction occurs at ambient temperatures. In all cases, it takes place between ambient temperatures and the reflux temperature of the system. The reaction is preferably carried out under an inert atmosphere, such as nitrogen. In carrying out the above reaction as indicated in Equations 1–3, hydrogen gas is evolved. It is possible to follow the completion of the reaction by awaiting cessation of the evolution of hydrogen.

Experiments were carried out in order to determine whether the course of the reaction varied in a systematic way with the strength and type (aromatic or aliphatic) of acid used. Reactions were carried out with various acids and with different ratios of acid to hydride. For the different acids, the results did not vary in any systematic manner. Using dibutyltin dihydride and an acid to hydride ratio of 1.25, acetic acid yields 82% ditin. A stronger acid, chloroacetic, yielded more monotin compound than ditin. The still stronger acid, trifluoroacetic, yielded more ditin than the monotin compound.

An additional method for forming the diacyloxyditins of the instant invention is the reaction of a disubstituted tin compound of the formula $R_2Sn$ with an acyl peroxide of the general formula $[R'C(O)OO]_2$ wherein R and R' are as defined hereinbefore. Obviously the scope of this reaction is limited by the availability of diacyl peroxides. A preferred peroxide is benzoylperoxide.

For the purpose of gving those skilled in the art a better understanding of the invention, the following illustrative examples are given:

Example 1

To approximately 120 ml. of an ether solution containing 0.05 mole of diphenyltin dihydride was added 0.1 mole of caproic acid. Evolution of gas started within a few minutes and was 90% complete in about 8 hours. Concentration of the solution gave 14.8 g. (77%), M.P. 58–72° C. of colorless, crystalline impure 1,1,2,2-tetraphenyl-1,2-dihexanoyloxyditin. Recrystallization from 40–60° C. petroleum ether resulted in a final recovery of 9.55 g. (49%) M.P. 85–87° C. This compound appeared to have a normal melting point. No decomposition was observed during melting or when the temperature was raised to 175° C.

Example 2

To approximately 25 ml. of an ether solution containing 0.05 mole of diphenyltin dihydride was added 0.04 mole of dichloroacetic acid. Evolution of gas started within a few minutes and was over 97% complete in three hours. Colorless crystals which had formed during the reaction were filtered off gving 13.66 g. (85%) of impure 1,1,2,2-tetraphenyl - 1,2 - bis-(dichloroacetoxy)ditin. Recrystallization of 3 g. from chloroform resulted in a final recovery of 2.81 g. (75%) M.P. 169° C. (dec.), when melting point was taken in the usual fashion, sintering started at 158° C. with melting at 169° C. accompanied by gas evolution and formation of a brown-black residue.

Example 3

7.16 g. of diphenyltin dihydride (0.025 mole) was mixed with 5.85 g. (0.375 mole) of o-chlorobenzoic acid and 35 ml. of anhydrous ether. The reaction was 50% complete in 2 hours and 100% complete in 20 hours.

The precipitate (11.44 g.) of impure 1,1,2,2-tetraphenyl-1,2-bis-(o-chlorobenzoyloxy)ditin was recrystallized from chloroform giving 8.91 g. (83%), M.P. 161° C.

Following the procedure of the preceding examples, the following reactants yielded the specified product:

| Example | Hydride used (amount) | Acid used (amount) | Product |
|---|---|---|---|
| 4 | diphenyltin dihydride (0.05 mole) | acetic acid (0.04 mole) | 1,1,2,2-tetraphenyl-1,2-diacetoxyditin. |
| 5 | ___do___ | monochloroacetic acid (0.1 mole) | 1,1,2,2-tetraphenyl-1,2-bis-(monochloroacetoxy)ditin. |
| 6 | ___do___ | trichloroacetic acid (0.1 mole) | 1,1,2,2-tetraphenyl-1,2-bis-(trichloroacetoxy)ditin. |
| 7 | ___do___ | trifluoroacetic acid (0.124 mole) | 1,1,2,2-tetraphenyl-1,2-bis-(trifluoroacetoxy)ditin. |
| 8 | diphenyltin dihydride (0.025 mole) | benzoic acid (0.0375 mole) | 1,1,2,2-tetraphenyl-1,2-dibenzoyloxyditin. |
| 9 | diphenyltin dihydride (0.05 mole) | o-hydroxybenzoic acid (0.1 mole) | 1,1,2,2-tetraphenyl-1,2-bis-(o-hydroxybenzoyloxy)ditin. |
| 10 | ___do___ | octanoic acid (0.1 mole) | 1,1,2,2-tetraphenyl-1,2-dioctanoyloxyditin. |
| 11 | di-n-butyltin dihydride (0.033 mole) | o-chlorobenzoic acid (0.025 mole) | 1,1,2,2-tetrabutyl-1,2-bis-(o-chlorobenzoyloxy)ditin. |
| 12 | di-n-butyltin dihydride (0.033 mole) (ratio of acid to hydride—0.77) | lauric acid | 1,1,2,2-tetrabutyl-1,2-dilauroyloxyditin. |
| 13 | di-n-butyltin dihydride (0.033 mole) (ratio of acid to hydride—1.25) | formic acid | 1,1,2,2-tetrabutyl-1,2-diformoxyditin. |
| 14 | di-n-butyltin dihydride (0.033 mole) (ratio of acid to hydride—1.25) | p-methylbenzoic acid | 1,1,2,2-tetrabutyl-1,2-bis-(p-methylbenzoyloxy)ditin. |

*Example 15*

Variation of product with the different molar ratios of reactants is illustrated in the reaction of di-n-butyltin dihydride with varying amounts of benzoic acid, as follows:

A. To 4.7 g. (0.02 mole) of di-n-butyltin dihydride was added 4.88 g. (0.04 mole) of benzoic acid. Evolution of gas started within one hour and was complete in 4 hours giving a corrected volume of 730 ml. As the reaction progressed, the mass became liquid and finally turned solid again (M.P. 50–70° C.). Based on the reaction of a portion of the solid product reacted with a solution of bromine in carbon tetrachloride a 9.4% yield of the ditin diester was obtained, based on di-n-butyltin dihydride. Three recrystallizaitons of 7.96 g. of product from petroleum ether (30–60° C.) gave 1.28 g. (16.1%), M.P. 68–71° C. for the analytical sample. An additional 2.85 g. (35.8%), M.P. 68–71°C., of di-n-butyltin dibenzoate was recovered from mother liquors.

B. To 4.7 g. (0.02 mole) of di-n-butyltin dihydride was added 2.44 g. (0.02 mole) of benzoic acid. Evolution of gas was 80% complete in 12 hours. After 46 hours gas evolution had ceased giving a volume (corrected) of 631 ml. Bromine analysis of a sample of the product showed 69% yield of the ditin diester based on di-n-butyltin dihydride. The remaining liquid (6.7 g.) mixed with 25 ml. of anhydrous ether, after standing at —70° C. overnight, gave 4.59 g. (65%) of colorless crystals of 1,1,2,2-tetra-n-butyl-1,2-dibenzoyloxyditin, M.P. 31.5–32.0° C. $n_D^{30}$ 1.5578. In a similar experiment 98% of the theoretical amount of bromine was consumed by the tin.

*Example 16*

Similar results were obtained with the reaction of di-n-butyltin dihydride and acetic acid. When reacted in a 1:2 molar ratio, a yield of 90% of di-n-butyltin diacetate was obtained. The reaction of a 1:1 molar ratio resulted in a yield of 65% of 1,1,2,2-tetra-1,2-diacetoxyditin.

*Example 17*

To 1.02 g. of 88% di-n-butyltin dihydride (0.00383 mole) was added 1.82 g. (0.00383 mole) of di-n-butyltin dibenzoate and 5 ml. of anhydrous ether. Gas evolution started within 15 minutes and was complete in 36 hours, giving a corrected volume of 86 ml. (100%). Recrystallization of 94% of the product of the reaction from 10 ml. of anhydrous ether cooled to —70° C. gave 2.25 g. corresponding to an 88% yield of slightly impure 1,1,2,2-tetra-n-butyl-1,2-dibenzoyloxyditin, M.P. 25–27° C., $n_D^{30}$ 1.5579. A second recrystallization from anhydrous ether at —70° C. yielded 1.21 g. (48%) of product, M.P. 31–33° C.

*Example 18*

To 4.7 g. (0.02 mole) of di-n-butyltin dihydride was added 7.2 g. (0.02 mole) of di-n-butyltin diacetate. Evolution of gas started within 10 minutes and was 98% complete in 10 hours. After 18 hours, gas evolution had ceased giving a corrected volume of 410 ml. (92% of the theoretical). A sample of the colorless liquid (11.7 g.) remaining in the flask decomposed on attempted distillation at 1 mm. Recrystallization of the remaining 11.35 g. from 25 ml. of anhydrous ether cooled to —70° C. gave 10.06 g. (91%) of colorless needles of 1,1,2,2-tetra-n-butyl-1,2-diacetoxyditin, M.P. —7.0 to —4.0, $n_D^{26}$ 1.5068.

*Example 19*

To a solution of 0.77 g. (3.13 moles) of benzoyl peroxide in 10 ml. of benzene was added 1.7 g. (6.25 moles) of diphenyltin. A slightly exothermic reaction occurred. Crystals began to appear after 15 minutes. After standing overnight, the product was filtered off; 2.0 g. (81%) of 1,1,2,2-tetraphenyl-1,2-dibenzoyloxyditin, M.P. 172–177° C. was obtained. Recrystallization from benzene provided a sample, M.P. 184–185° C., which was undepressed when mixed with a sample prepared from the reaction of diphenyltin dihydride with benzoic acid.

*Anal.*—Calcd. for $C_{36}H_{30}O_4Sn_2$: C, 57.92; H, 3.84; Sn, 30.12. Found: C, 57.82; H, 3.79; Sn, 30.25.

The dibutyltin dihydride and the diphenyltin dihydride were used in the experiments because these are the most available diorganotin dihydrides. Equivalent tetraalkyl (or aryl) diacyloxy ditins are prepared using such equivalent reactants as dimethyltin dihydride, dipropyltin dihydride, divinyltin dihydride, dibenzyltin dihydride, and dioctyltin dihydride.

The ditin products of the present invention are relatively stable in air. They have beeen tested and found to be stabilizers for the prevention of heat and light degradation of polyvinyl chloride polymers. They also catalyze the curing the polyurethane foams. These compounds have also been found to have biocidal activity. 1,1,2,2-tetramethyl-1,2-diacetoxyditin has been found to suppress or retard the growth of the following organisms: *Aspergillus flavus, Aerobacter aerogenes, Pseudomonas aeruginosa*, and *Staphylococcus aureus*. 1,1,2,2-tetrabutyl-1,2-diacetoxyditin was similarly tested and found to suppress or retard the growth of *Aspergillus flavus, Aerobacter aerogenes, Staphylococcus aureus*, and *Caneida albicans*.

As many embodiments of this invention may be made without departing from the spirit and scope thereof, it is to be understood that the invention includes all such modifications and variations as come within the scope of the appended claims.

We claim:

1. A process for preparing 1,1,2,2-tetra-substituted-1,2-diacyloxyditins which comprises reacting a disubstituted tin dihydride of the general formula $R_2SnH_2$ with a carboxylic acid of the general formula R'COOH wherein R and R' are hydocarbon groups selected from the class consisting of alkyl and monocyclic aryl groups having 1 to 18 carbon atoms.

2. A process according to claim 1 in which the reactants are in solution.

3. A process according to claim 2 in which the reaction is carried out at about room temperature.

4. A process according to claim 2 utilizing the reactants in a molar ratio of at least about one mole of the tin dihydride per mole of the acid.

5. A process for preparing 1,1,2,2-tetrasubstituted-1,2-diacyloxyditins which comprises reacting a disubstituted tin diacyloxy compound of the general formula R₂Sn(OCOR')₂ with a disubstituted tin dihydride of the general formula R₂SnH₂ wherein R and R₂ are hydrocarbon groups selected from the class consisting of alkyl and monocyclic aryl groups having 1 to 18 carbon atoms.

6. A process according to claim 5 in which the reactants are in solution.

7. A process according to claim 6 in which the reaction is carried out at about room temperature.

8. A process for preparing 1,1,2,2-tetrasubstituted 1,2-diacyloxy ditins which comprises reacting a disubstituted tin compound of the formula R₂Sn with an acyl peroxide of the formula

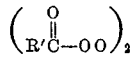

wherein R and R' are hydrocarbon groups selected from the class consisting of alkyl and monocyclic aryl groups having 1 to 18 carbon atoms.

9. A process according to claim 8 in which the peroxide is benzoyl peroxide.

10. A process according to claim 9 in which the disubstituted tin is diphenyltin.

11. 1,2-diacyloxyditins having the general formula

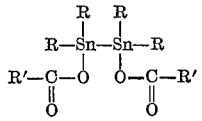

wherein R and R' are hydrocarbon groups selected from the class consisting of alkyl and monocyclic aryl groups having 1 to 18 carbon atoms.

12. The compounds of claim 11 in which R is an alkyl group having 1 to 8 carbon atoms.

13. The compounds of claim 11 in which R is the phenyl group.

14. 1,1,2,2-tetra-n-butyl-1,2-diacetoxyditin.

15. 1,1,2,2-tetraphenyl-1,2-dibenzoyloxyditin.

16. 1,1,2,2-tetraphenyl-1,2-diacetoxyditin.

17. 1,1,2,2 - tetraphenyl-1,2-bis-(orthohydroxybenzoyloxy)ditin.

18. 1,1,2,2-tetraphenyl-1,2-bis-(trichloroacetoxy)ditin.

19. 1,1,2,2-tetrabutyl-1,2-dilauroyloxyditin.

20. 1,1,2,2-tetraphenyl-1,2-dioctanoyloxyditin.

No references cited.